United States Patent
Fitzgerald

(10) Patent No.: US 7,205,031 B2
(45) Date of Patent: Apr. 17, 2007

(54) COATING SYSTEM COMPRISING A DRY POWDER COMPOSITION DISPERSIBLE IN WATER

(76) Inventor: Fergus Rupert Fitzgerald, 330 Marina Village, Malahide, Dublin (IE)

( * ) Notice: Subject to any disclaimer, the term of this patent is extended or adjusted under 35 U.S.C. 154(b) by 246 days.

(21) Appl. No.: 10/686,525

(22) Filed: Oct. 16, 2003

(65) Prior Publication Data

US 2004/0259995 A1 Dec. 23, 2004

Related U.S. Application Data

(60) Division of application No. 09/929,051, filed on Aug. 15, 2001, which is a continuation of application No. PCT/IE00/00021, filed on Feb. 14, 2000, now Pat. No. 6,759,462.

(30) Foreign Application Priority Data

Feb. 15, 1999 (IE) .................................... 990106

(51) Int. Cl.
*B05D 1/36* (2006.01)
*B05D 3/02* (2006.01)
*B05D 7/00* (2006.01)
*B28B 19/00* (2006.01)
*E04B 1/00* (2006.01)

(52) U.S. Cl. .............. 427/393.6; 52/309.13; 52/309.14; 52/309.17; 52/514.5; 52/516; 52/741.3; 52/741.4; 52/741.41; 427/372.2; 427/429; 427/385.5; 427/389.9; 427/391; 427/407.1; 427/411; 427/421.1; 427/428.01; 524/425; 524/426; 524/427; 524/284; 524/300; 524/320; 524/321; 524/2; 524/4; 524/5; 524/8; 524/301; 524/445

(58) Field of Classification Search ................ 524/425, 524/427, 284, 300, 320, 321, 2, 4, 5, 8, 301, 524/445; 52/309.13, 516, 309.14, 309.17, 52/514.5, 741.3, 741.4, 741.41; 427/372.2, 427/429, 385.5, 389.9, 391, 393.6, 407.1, 427/411, 421.1, 428.01

See application file for complete search history.

(56) References Cited

U.S. PATENT DOCUMENTS 3,164,562 A * 1/1965 Breed .................... 524/375
3,891,582 A * 6/1975 Desmarais
3,907,725 A * 9/1975 Forte et al.
4,743,475 A 5/1988 Negri et al. ............ 427/387
5,576,384 A * 11/1996 N olken et al. ......... 524/806

FOREIGN PATENT DOCUMENTS

DE 4300319 C1 1/1994

* cited by examiner

*Primary Examiner*—Patrick Niland
(74) *Attorney, Agent, or Firm*—Jacobson Holman PLLC

(57) ABSTRACT

A coating system for in-situ coating of a surface formed by a plurality of plasterboard sections comprises a dry powder composition which is dispersible in an aqueous applicator medium and provides a very high quality surface finish to which gloss or matt paint may be applied directly without joint photographing or show-through of fasteners. The coating composition may be applied by a spray coating technique or a roller technique. The dry powder composition comprises calcium carbonate and, by weight, relative to calcium carbonate, from 4% to 11% of a polymeric binder, from 0.60% to 1.5% of a thickening agent and from 0.10% to 0.35% of a surfactant.

17 Claims, No Drawings

COATING SYSTEM COMPRISING A DRY POWDER COMPOSITION DISPERSIBLE IN WATER

This is a Divisional of application Ser. No. 09/929,051 filed Aug. 15, 2001 now U.S. Pat. No. 6,759,462. which in turn is a Continuation of PCT application No. PCT/IE00/00021 filed Feb. 14, 2000.

INTRODUCTION

The invention relates to a coating composition for in situ coating a surface, especially a wall formed by plasterboard wall panels to provide a high quality surface finish.

Plasterboard which is referred to in some countries as wallboard, gypsum wallboard, or drywall is widely used to provide internal walls and/or ceilings in building constructions. The plasterboard is cut to a desired size from large panels and the cut lengths are attached to fixtures such as wall bates. The joints between adjacent boards are filled and the surface of the wall is skimmed with a plaster compound by manual trowelling. This is extremely time consuming, labour intensive, and requires considerable skill. In addition, even with such skilled finishing techniques joints and fixing points are often clearly visible through the skin. This is a particular problem when the wall is painted as the painting tends to highlight rather than hide such imperfections.

There is therefore a need for a coating system for coating a surface, especially an erected plasterboard wall or ceiling which will eliminate or at least substantially reduce the problems with known systems.

STATEMENTS OF INVENTION

According to the invention there is provided a coating system for in-situ coating of a surface comprising a dry powder composition which is dispersible in an aqueous applicator medium, the dry powder composition comprising calcium carbonate and, by weight, relative to calcium carbonate, from 4% to 11% of a polymeric binder from 0.60% to 1.5% of a thickening agent and from 0.10% to 0.35% of a surfactant.

Preferably the polymeric binder is an EVA (vinyl acetate/ethylene) binder.

Preferably the Surfactant is sodium citrate. Most preferably the thickening agent is an inert mineral thickening agent which may be derived from Attapulgite.

In one embodiment the binder is present in an amount of approximately 5% by weight relative to the calcium carbonate.

In another embodiment the binder is present in an amount of approximately 10% by weight relative to the calcium carbonate.

In one embodiment the surfactant is present in an amount of approximately 0.15% by weight relative to the calcium carbonate.

In another embodiment the surfactant is present in an amount of approximately 0.30% by weight relative to the calcium carbonate.

In one embodiment the thickening agent is present in an amount of approximately 0.63% by weight relative to the calcium carbonate.

In another embodiment the thickening agent is present in an amount of approximately 1.26% by weight relative to the calcium carbonate.

Preferably the coating system includes a preservative/biocide. Most preferably the preservative/biocide is present in an amount from 0.25% to 0.35% by weight relative to the calcium carbonate. Preferably the preservative/biocide is sodium benzoate. Ideally the preservative/biocide is present in an amount of approximately 0.30% by weight relative to the calcium carbonate.

One aspect of the invention provides a coating system for in-situ coating of a surface formed by a plurality of plasterboard sections comprising a dry powder composition which is dispersible in an aqueous applicator medium, the dry powder composition comprising calcium carbonate and, by weight, relative to calcium carbonate, approximately 5% of a polymeric binder, approximately 0.63% of a thickening agent, approximately 0.15% of a surfactant and approximately 0.30% of a preservative/biocide.

Another aspect provides a coating system for in-situ coating of a surface formed by a plurality of plasterboard sections comprising a dry powder composition which is dispersible in an aqueous applicator medium, the dry powder composition comprising calcium carbonate and, by weight, relative to calcium carbonate, approximately 10% of a polymeric binder, approximately 1.26% of a thickening agent, approximately 0.30% of a surfactant and approximately 0.30% of a preservative/biocide.

A further embodiment of the invention provides a method for preparing a dry powder composition comprising the steps of:

preparing a premix comprising the surfactant, the thickening agent and the biocide/preservative; and adding the premix to at least part of the calcium carbonate and binder.

In a preferred embodiment the method includes the step of dry mixing at least a portion of the calcium carbonate with at least some of the binder and adding the premix to the calcium carbonate/binder mixture. Ideally the method comprises mixing approximately half of the calcium carbonate with the binder, adding the premix and subsequently adding the balance of the binder.

The invention further provides a method for preparing a coating composition especially for application in situ to a wall formed by a number of plasterboard sections comprising the step of mixing a dry powder composition with water.

Preferably the dry powder composition is mixed with water in an amount of approximately 2 kg of coating composition per 1 litre of water.

In one embodiment of the invention the method includes the step of adding a pigment to the mixture. Preferably the pigment is present in an amount of from 0.5% to 5% by weight relative to calcium carbonate.

In addition the invention provides a method of coating a surface formed by a plurality of plasterboard sections comprising applying a coating composition of the invention. Ideally the coating composition is applied by a spray coating technique. Alternatively the coating composition may be applied by a roller technique.

DETAILED DESCRIPTION

The invention will be more clearly understood from the following description thereof given by way of example only.

A coating composition for in situ coating a wall formed by plasterboard wall panels is prepared as follows from the following ingredients.

|  | Spray Grade | Roller Grade |
| --- | --- | --- |
| Calcium Carbonate | 1000 kgs | 1000 kgs |
| EVA Binder | 50 kgs | 100 kgs |
| Sodium Benzoate | 3 kgs | 3 kgs |
| Sodium Citrate | 1.5 kgs | 3 kgs |
| Thickening Agent | 6.3 kgs | 12.6 kgs |

A premix is first prepared by mixing in dry powder form, the sodium benzoate, sodium citrate and the thickening agent.

500 kgs of the calcium carbonate are mixed with all of the EVA binder. The premix is then added and the resultant dry power is fully mixed and blended.

The remaining 500 kgs of calcium carbonate is then added to form a dry powder coating composition.

The liquid coating composition may be applied to a plasterboard wall using an airless paint spray plant. The composition is dispersed in water to form a coating which may be applied directly to the wall. 15 kgs of the composition are added to about 7 litres of water and the mixture is dispersed by vigorous mixing for several minutes.

The liquid coating composition thus formed is applied to a plasterboard wall using an airless paint spray plant. The surface is coated with an even and consistent film which on drying, provides a "white-out" surface.

Analogously the liquid coating composition may also be applied to a plasterboard wall using a roller. In this case, the composition is dispersed in water to form a coating which may be applied directly to the wall. The liquid coating composition thus formed may then be applied to a plasterboard wall using a conventional roller. The surface is coated with an even and consistent film which on drying, provides a "white-out" surface.

It has been found that the coating achieves a very high quality surface finish to which gloss or matt paint may be applied directly without joint photographing or show-through of fasteners.

It will be appreciated that while the invention has been described as a coating for application to plasterboard panels the coating composition may be applied to other surfaces for example as a primer to a wallpaper, especially a non-embossed wallpaper.

The invention is not limited to the embodiments hereinbefore described which may be varied in detail.

The invention claimed is:

1. A method for in-situ coating a surface formed by a plurality of plasterboard sections, said method comprising the steps of:

providing a coating composition comprising calcium carbonate and, by weight, relative to the calcium carbonate, from 4% to 11% of a polymeric binder, from 0.60% to 1.5% of a thickening agent and from 0.10% to 0.35% of a surfactant, dispersed in water; and applying the coating composition to a surface formed by the plasterboard sections using one of an airless spray coating technique and a roller technique.

2. The method as claimed in claim 1, wherein the binder is an EVA binder.

3. The method as claimed in claim 1, wherein the surfactant is sodium citrate.

4. The method as claimed in claim 1, wherein the thickening agent is an inert mineral thickening agent.

5. The method as claimed in claim 4, wherein the inert mineral thickening agent is derived from Attapulgite.

6. The method as claimed in claim 1, wherein the binder is present in an amount of approximately 5% by weight relative to the calcium carbonate.

7. The method as claimed in claim 1, wherein the binder is present in an amount of approximately 10% by weight relative to the calcium carbonate.

8. The method as claimed in claim 1, wherein the surfactant is present in an amount of approximately 0.15% by weight relative to the calcium carbonate.

9. The method as claimed in claim 1, wherein the surfactant is present in an amount of approximately 0.30% by weight relative to the calcium carbonate.

10. The method as claimed in claim 1, wherein the thickening agent is present in an amount of approximately 0.63% by weight relative to the calcium carbonate.

11. The method as claimed in claim 1, wherein the thickening agent is present in an amount of approximately 1.26% by weight relative to the calcium carbonate.

12. The method as claimed in claim 1, further comprising a preservative/biocide.

13. The method as claimed in claim 12, wherein the preservative/biocide is present in an amount of from 0.25% to 0.35% by weight relative to the calcium carbonate.

14. The method as claimed in claim 12, wherein the preservative/biocide is sodium benzoate.

15. The method as claimed in claim 12, wherein the preservative/biocide is present in an amount of approximately 0.30% by weight relative to the calcium carbonate.

16. The method as claimed in claim 1, further comprising the step of adding a pigment to the mixture.

17. The method as claimed in claim 16, wherein the pigment is added in an amount of from 0.5% to 5% by weight relative to calcium carbonate.

* * * * *